US012756704B2

(12) United States Patent
Douglas et al.

(10) Patent No.: US 12,756,704 B2
(45) Date of Patent: Oct. 6, 2026

(54) SYSTEMS AND METHODS FOR SUCCESSIVELY EXECUTING AND OPERATION OVER MULTIPLE COMMUNICATION NETWORKS

(71) Applicant: Capital One Services, LLC, McLean, VA (US)

(72) Inventors: Lawrence Douglas, McLean, VA (US); Jeffrey Rule, Chevy Chase, MD (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 83 days.

(21) Appl. No.: 19/002,652

(22) Filed: Dec. 26, 2024

(65) Prior Publication Data

US 2025/0126115 A1 Apr. 17, 2025

Related U.S. Application Data

(63) Continuation of application No. 17/937,991, filed on Oct. 4, 2022, now Pat. No. 12,218,930.

(51) Int. Cl.
*H04L 9/40* (2022.01)
*G06F 12/14* (2006.01)

(52) U.S. Cl.
CPC ...... *H04L 63/0853* (2013.01); *G06F 12/1416* (2013.01); *H04L 63/10* (2013.01)

(58) Field of Classification Search
CPC ............................. H04L 63/0853; G06F 21/34
See application file for complete search history.

(56) References Cited

U.S. PATENT DOCUMENTS

2013/0024371 A1 1/2013 Hariramani et al.
2013/0047246 A1 2/2013 Radhakrishnan
(Continued)

FOREIGN PATENT DOCUMENTS

WO WO-2022/146530 A1 7/2022

OTHER PUBLICATIONS

International Search Report and Written Opinion on PCT Appl. Ser. No. PCT/US2023/075897 Dated Oct. 4, 2022 (8 pages).
(Continued)

*Primary Examiner* — Esther B. Henderson
(74) *Attorney, Agent, or Firm* — Foley & Lardner LLP

(57) ABSTRACT

Systems and methods for successively executing an operation over multiple communication networks. In some aspects, the system obtains first access information received from a physical token and generates an operation related to an aggregated virtual container. The system determines a first communication network from the first access information and transmits, via the first communication network, the operation associated with the aggregated virtual container. If the operation was not transmitted successfully via the first communication network, the system obtains second access information received from the physical token, determines a second communication network from the second access information, and transmits, via the second communication network, the operation associated with the aggregated virtual container. If the operation was transmitted successfully via the second communication network, the system generates for display a notification that the operation has been executed.

20 Claims, 6 Drawing Sheets

400

(56) References Cited

U.S. PATENT DOCUMENTS

| | | | |
|---|---|---|---|
| 2014/0096210 | A1 | 4/2014 | Dabbiere |
| 2017/0357977 | A1 | 12/2017 | Pitz et al. |
| 2018/0211247 | A1 | 7/2018 | England et al. |
| 2018/0302479 | A1 | 10/2018 | Kolbe et al. |
| 2018/0336554 | A1* | 11/2018 | Trotter ................ H04L 63/0853 |
| 2020/0151311 | A1 | 5/2020 | Noe et al. |
| 2021/0037544 | A1 | 2/2021 | Andrews et al. |
| 2021/0150511 | A1 | 5/2021 | Mandloi et al. |
| 2021/0385213 | A1 | 12/2021 | Yoo et al. |

OTHER PUBLICATIONS

US Non-Final Office Action on U.S. Appl. No. 17/937,983 Dated Mar. 20, 2025 (26 pages).

* cited by examiner

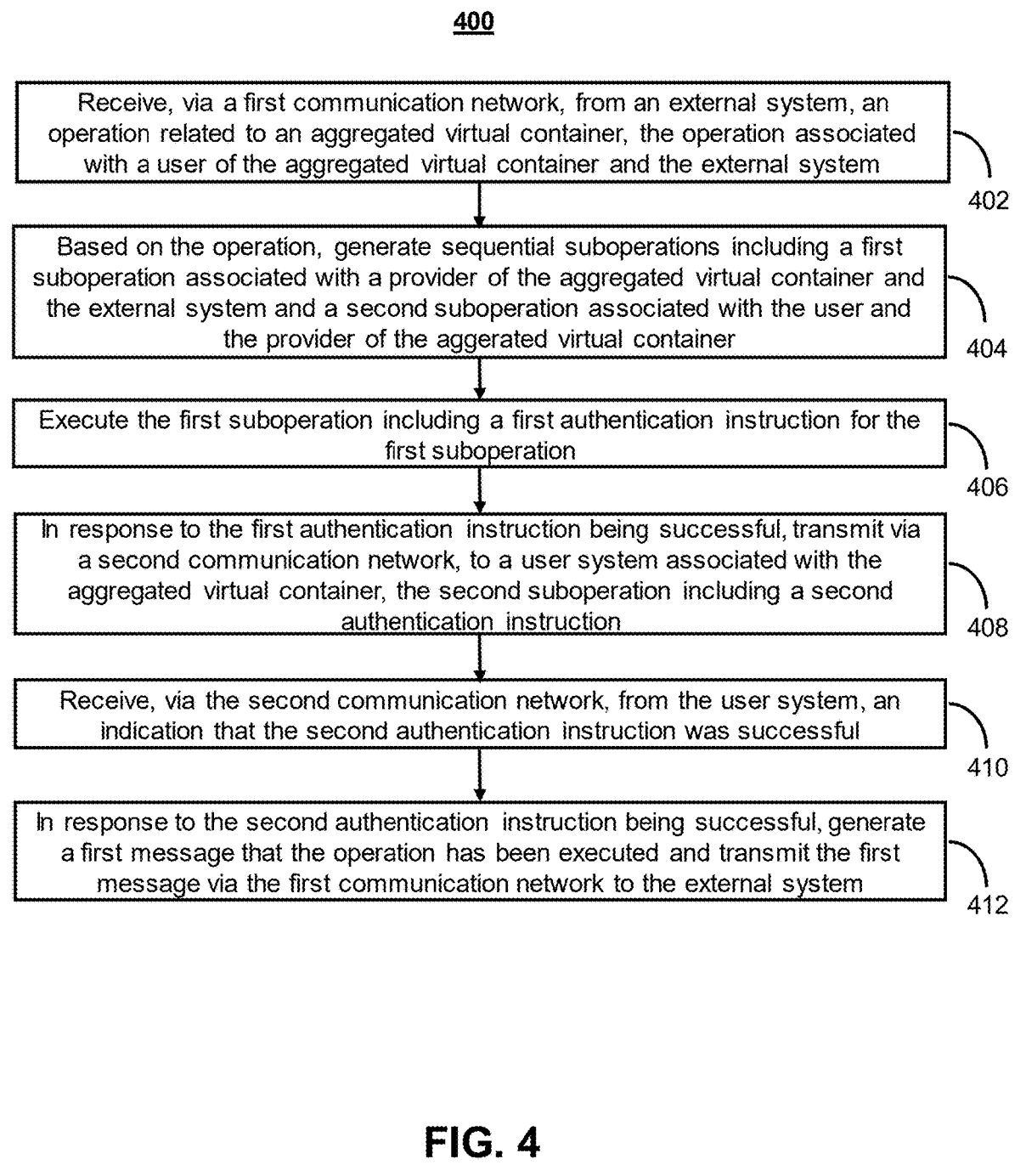

400

Receive, via a first communication network, from an external system, an operation related to an aggregated virtual container, the operation associated with a user of the aggregated virtual container and the external system — 402

↓

Based on the operation, generate sequential suboperations including a first suboperation associated with a provider of the aggregated virtual container and the external system and a second suboperation associated with the user and the provider of the aggerated virtual container — 404

↓

Execute the first suboperation including a first authentication instruction for the first suboperation — 406

↓

In response to the first authentication instruction being successful, transmit via a second communication network, to a user system associated with the aggregated virtual container, the second suboperation including a second authentication instruction — 408

↓

Receive, via the second communication network, from the user system, an indication that the second authentication instruction was successful — 410

↓

In response to the second authentication instruction being successful, generate a first message that the operation has been executed and transmit the first message via the first communication network to the external system — 412

FIG. 4

SYSTEMS AND METHODS FOR SUCCESSIVELY EXECUTING AND OPERATION OVER MULTIPLE COMMUNICATION NETWORKS

CROSS-REFERENCE TO RELATED APPLICATIONS

This application is a continuation of U.S. patent application Ser. No. 17/937,991, filed Oct. 4, 2022. The content of the foregoing application is incorporated herein in its entirety by reference.

SUMMARY

Systems and methods are described herein for facilitating execution of an operation associated with a user over multiple communication networks. For example, there may be multiple authentication tokens associated with the user (e.g., tokens associated with multiple accounts for the user). When attempting to authenticate one of their user accounts at an external system, the user may not have suitable information available to recall the desired authentication token to be used or may have to review one or more of their authentication tokens in succession before eventually selecting the desired authentication token. Further, if a communication network associated with the selected authentication token is unavailable, the user may not be able to complete the operation. The user may not realize that the communication network is unavailable and attempt to use another authentication token associated with the same communication network. This may result in a low operation completion rate as the operation and others like it would remain uncompleted even after user effort to address the issue.

In some embodiments, to address one or more of the technical problems described above, systems and methods are described herein for executing an operation over multiple communication networks. Instead of the user having to coordinate between multiple authentication tokens associated with the user, the user may be provided a physical authentication token (e.g., in the form of a card, a fob, or another suitable form) that is assigned to the user and is virtually associated with the multiple authentication tokens for the user (e.g., tokens associated with multiple accounts for the user). A provider system associated with the physical authentication token may have previously received information regarding the multiple authentication tokens from the user and virtually associated these tokens with the physical authentication token provided to the user. For example, the provider system may have virtually associated these tokens with the physical authentication token before or after providing the token to the user.

The described systems and methods for executing an operation over multiple communication networks improve upon conventional systems described above. In particular, when the user attempts to use the physical authentication token, the associated operation may be sent to the provider system and split into two suboperations for sequential execution. For example, the provider system may receive the operation via a first communication network from the external system and generate sequential suboperations including a first suboperation (e.g., between the provider system and the external system) and a second suboperation (e.g., between the user and the provider system). The provider system may execute the first suboperation, and if the first suboperation is executed successfully, transmit the second suboperation via a second communication network. The second suboperation may include an authentication token for a selected user account and be executed at a system associated with the selected user account. If the second suboperation is executed successfully, the provider system may return a message to the external system that the operation has been executed successfully. In this way, the operation is executed without requiring the user or external system initiating the operation to handle or even be aware of the operation being executed over multiple communication networks as this process is seamlessly implemented by the provider system.

In some embodiments, the system receives, via a first communication network, from an external system, an operation related to an aggregated virtual container. The operation may be associated with a user of the aggregated virtual container and the external system. Based on the operation, the system generates sequential suboperations including a first suboperation associated with a provider of the aggregated virtual container and the external system and a second suboperation associated with the user and the provider of the aggregated virtual container. The system executes the first suboperation including a first authentication instruction for the first suboperation. In response to the first authentication instruction being successful, the system transmits via a second communication network, to a user system associated with the aggregated virtual container, the second suboperation including a second authentication instruction for the second suboperation. The system receives, via the second communication network, from the user system, an indication that the second authentication instruction was successful. In response to the second authentication instruction being successful, the system generates a first message indicating that the operation has been executed and transmits the first message via the first communication network to the external system.

In some embodiments, to address one or more of the technical problems described above, systems and methods are described herein for executing sequential suboperations at an aggregated virtual container provider system. Conventionally, when attempting to authenticate one of their user accounts at an external system, the user may have to recall the desired authentication token to be used or review one or more of their authentication tokens in succession before eventually selecting the desired authentication token. Further, even if the user were provided with a physical authentication token as described above, to the extent the external system or another system may have a preference for one or more of the user's authentication tokens (e.g., for compatibility), they would not be able to select the desired authentication token.

The described systems and methods for executing sequential suboperations at an aggregated virtual container provider system improve upon conventional systems described above. In particular, when the user attempts to use the physical authentication token, the associated operation may be sent to the provider system and split into two suboperations for sequential execution. For example, the provider system may receive the operation and generate sequential suboperations including a first suboperation (e.g., between the provider system and the external system) and a second suboperation (e.g., between the user and the provider system). The provider system may execute the first suboperation, and if the first suboperation is executed successfully, select a token from a plurality of tokens connected to the aggregated virtual container and transmit the second suboperation to a user system associated with the selected token. The provider system may select from the multiple authentication tokens according to one or more criteria. For example, the provider system may select an authentication token based on prior user input. In another example, the provider system may select an authentication token that is suitable for execution according to one or more criteria (e.g., compatibility) for the provider system. In yet another example, the provider system may exclude authentication tokens from the selection process based on prior history (e.g., incompatible authentication tokens or those that otherwise failed during execution). If the second suboperation is executed successfully, the provider system may return a message that the operation has been executed successfully. In this way, the operation is executed without requiring the user or another entity to provide input regarding which authentication token to select at the time of executing the operation at the provider system.

In some embodiments, the system receives an operation related to an aggregated virtual container. The operation may be associated with a user of the aggregated virtual container and an external system. Based on the operation, the system generates sequential suboperations including a first suboperation associated with a provider of the aggregated virtual container and the external system and a second suboperation associated with the user and the provider of the aggregated virtual container. The system executes the first suboperation including a first authentication instruction for the first suboperation. In response to the first authentication instruction being successful, the system selects a token from a plurality of tokens connected to the aggregated virtual container and transmits, to a user system associated with the selected token, the second suboperation including a second authentication instruction for the second suboperation. The system receives, from the user system, an indication that the second authentication instruction was successful. In response to the second authentication instruction being successful, the system generates a first message that the operation has been executed and transmitting the first message to the external system.

In some embodiments, to address one or more of the technical problems described above, systems and methods are described herein for successively executing an operation over multiple communication networks. Conventionally, when attempting to authenticate one of their user accounts at an external system, if a communication network associated with the physical authentication token is unavailable, the user may not be able to complete the operation. The user may not realize that the communication network is unavailable and attempt to use another authentication token associated with the same communication network, resulting in a low operation completion rate as the operation and others like it would remain uncompleted due to that communication network being unavailable.

The described systems and methods for successively executing an operation over multiple communication networks improve upon conventional systems described above. In particular, when the user attempts to use the physical authentication token, access information obtained from the token may be used to initially select a communication network and transmit an operation related to the token. However, if the initially selected communication network is unavailable or the associated operation is not acknowledged or executed within a threshold period of time, the system may determine another communication network from the access information obtained from the token and transmit the operation for execution. The system may continue this process until, either the operation is executed successfully, or no further communication networks are available from the obtained access information. In this way, the operation is automatically rerouted over another communication network in case of failure when attempting to execute the operation over the initially selected communication network.

In some embodiments, the system, in response to a physical token interacting with a token reader, obtains first access information received from the physical token and generates an operation related to the aggregated virtual container. The operation may be associated with a user of the aggregated virtual container and the external system. The system determines a first communication network from the first access information and transmits, via the first communication network, to a provider system associated with the aggregated virtual container, the operation associated with the aggregated virtual container. The system determines whether a message was received from the provider system within a threshold time period. The message may indicate that the operation has been executed. The system, in response to determining that the message was not received from the provider system via the first communication network within the threshold time period, obtains second access information received from the physical token. The system determines a second communication network from the second access information and transmits, via the second communication network, to the provider system, the operation associated with the aggregated virtual container. The system, in response to determining that the message was received from the provider system via the second communication network within the threshold time period, generates for display at the token reader a notification that the operation has been executed.

Various other aspects, features, and advantages of the disclosure will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in executing an operation over multiple communication networks, in accordance with one or more embodiments.

DETAILED DESCRIPTION OF THE DRAWINGS

In the following description, for the purposes of explanation, numerous specific details are set forth in order to provide a thorough understanding of the embodiments of the systems and methods described herein. It will be appreciated, however, by those having skill in the art, that the embodiments may be practiced without these specific details or with an equivalent arrangement. In other cases, well-known structures and devices are shown in block diagram form in order to avoid unnecessarily obscuring the embodiments.

Figure 1:
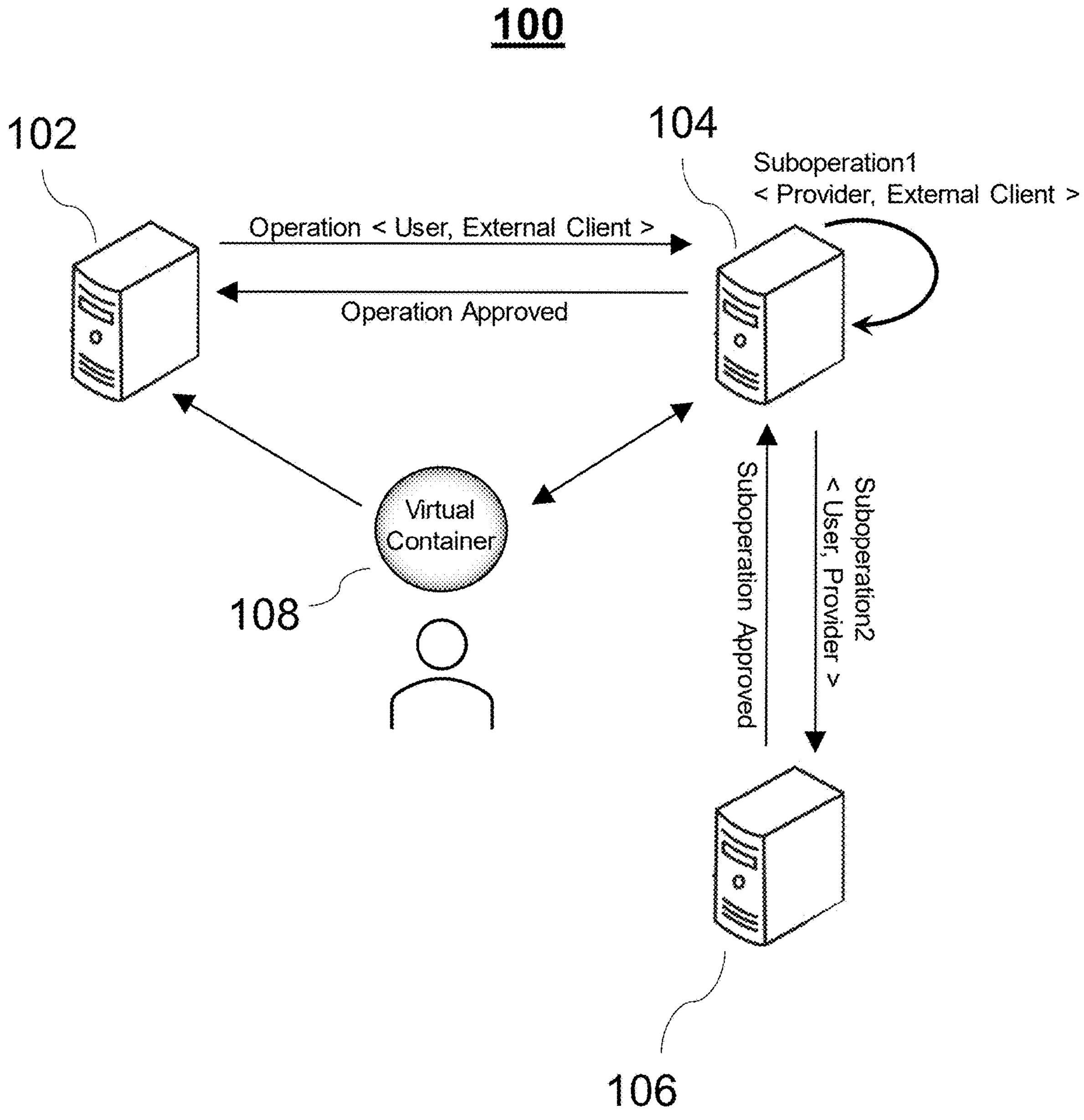
FIG. 1 shows an illustrative system for facilitating execution of an operation associated with a user over multiple communication networks, in accordance with one or more embodiments.

FIG. 1 shows illustrative system 100 for facilitating execution of an operation associated with a user over multiple communication networks, in accordance with one or more embodiments. Because there may be multiple authentication tokens associated with the user (e.g., tokens associated with multiple accounts for the user), when attempting to authenticate one of their user accounts at an external system, conventionally the user may have to recall the desired authentication token to be used or review one or more of their authentication tokens in succession before eventually selecting the desired authentication token. Instead of the user having to coordinate between multiple authentication tokens associated with the user, the described systems and methods provide for a physical authentication token (e.g., in the form of a card, a fob, or another suitable form; also referred to herein as physical token) that is assigned to the user and is virtually associated with the multiple authentication tokens for the user (e.g., tokens associated with multiple accounts for the user). For example, the physical authentication token may be associated with an aggregated virtual container such as container 108 shown in FIG. 1. Aggregated virtual container provider system 104 (also referred to herein as provider system 104) is associated with container 108 and may have previously received information regarding the multiple authentication tokens from the user and virtually associated these tokens with the physical authentication token provided to the user. For example, provider system 104 may virtually associate these tokens with the physical authentication token before or after providing the physical authentication token to the user.

When the user attempts to use the physical authentication token associated with container 108 at external client system 102 (also referred to herein as external system 102), an associated operation, Operation <User, External Client>, may be sent from external system 102 to provider system 104. Provider system 104 may receive the operation via a first communication network from external system 102. At provider system 104, the operation may be split into two suboperations for sequential execution. In particular, provider system 104 may generate sequential suboperations including a first suboperation (e.g., Suboperation1 <Provider, External Client> between provider system 104 and external system 102) and a second suboperation (e.g., Suboperation2 <User, Provider> between the user of container 108 and provider system 104). Provider system 104 may execute the first suboperation, and if the first suboperation is executed successfully, transmit the second suboperation via a second communication network to user system 106. For example, the first suboperation may include an authentication instruction for the first suboperation. If the authentication instruction for the first suboperation returns a successful result, the first suboperation may considered to be executed successfully.

The second suboperation may include an authentication token for a selected user account and be executed at user system 106 associated with the selected user account. If the second suboperation is executed successfully, provider system 104 may return a message to external system 102 that the operation has been executed successfully. For example, the second suboperation may include an authentication instruction for the second suboperation. The authentication instruction for the second suboperation may be executed at user system 106. If the authentication instruction for the second suboperation returns a successful result, the second suboperation may considered to be executed successfully. The operation may be executed without requiring the user of container 108 or external system 102 initiating the operation to handle or even be aware of the operation being executed over multiple communication networks as this process is seamlessly implemented by provider system 104.

In some embodiments, an access restriction may be in place for the user of container 108. For example, the access restriction may be put in place for new users or users that have not satisfied certain criteria for preapproval of user activity. The access restriction may require that the second suboperation be executed successfully before an operation approved message may be sent back to external system 102. Therefore, if the first suboperation is executed successfully, provider system 104 may determine whether an access restriction is in place for the user of container 108, and if there is no access restriction in place, provider system 104 may generate a message indicating the operation has been approved (or provisionally approved) and transmit the message via the first communication network to external system 102. However, if an access restriction is found to be in place, provider system 104 may generate a hold request for the operation. The hold request may prevent transmission of any message indicating the operation is approved or executed successfully until confirmation that the second suboperation has been executed successfully. After receiving confirmation that the second suboperation was executed successfully at user system 106, provider system 104 may generate a release request for the operation to allow transmission of the first message indicating that the operation has been executed successfully via the first communication network to external system 102.

In some embodiments, provider system 104 may select a token from a plurality of tokens connected to container 108. For example, provider system 104 may select the token in response to the first suboperation being executed successfully. Provider system 104 may select the token and transmit the second suboperation to user system 106 associated with the selected token. For example, provider system 104 may select a token specified by the user of container 108 prior to receiving the operation. In another example, provider system 104 may select a token based on at least some information received in the operation, such as information regarding compatibility or other suitable criteria. Provider system 104 may select the token that is compatible with the second communication network connecting provider system 104 and user system 106. In yet another example, provider system 104 may store information regarding tokens that were previously selected but resulted in operation failure. In such cases, provider system 104 may select from other remaining tokens according to criteria described with respect to the examples above or other suitable criteria.

In some embodiments, when a user attempts to use the physical token associated with container 108 at external system 102, the user may not be able to complete the operation if a communication network associated with the physical authentication token is unavailable. For example, access information obtained from the token may be used to initially select a communication network and transmit an operation related to the token. However, if the initially selected communication network is unavailable or the associated operation is not acknowledged or executed within a threshold period of time, external system 102 may determine another communication network from the access information obtained from the token and transmit the operation for execution. External system 102 may continue this process until, either the operation is executed successfully, or no further communication networks are available from the obtained access information. In some embodiments, the physical token may include memory having a primary access information field and a reserve access information field, and the first access information may be obtained from the primary access information field while the second access information may be obtained from the reserve access information field. The reserve access information field may be locked from reading from the memory until a condition is triggered for the physical token. The condition may be triggered for the physical token in response to determining that the operation was not transmitted successfully via the initially selected communication network. Additionally, or alternatively, the condition may be triggered for the physical token after a threshold time period elapses after the primary access information field has been read from the memory.

Figure 2:
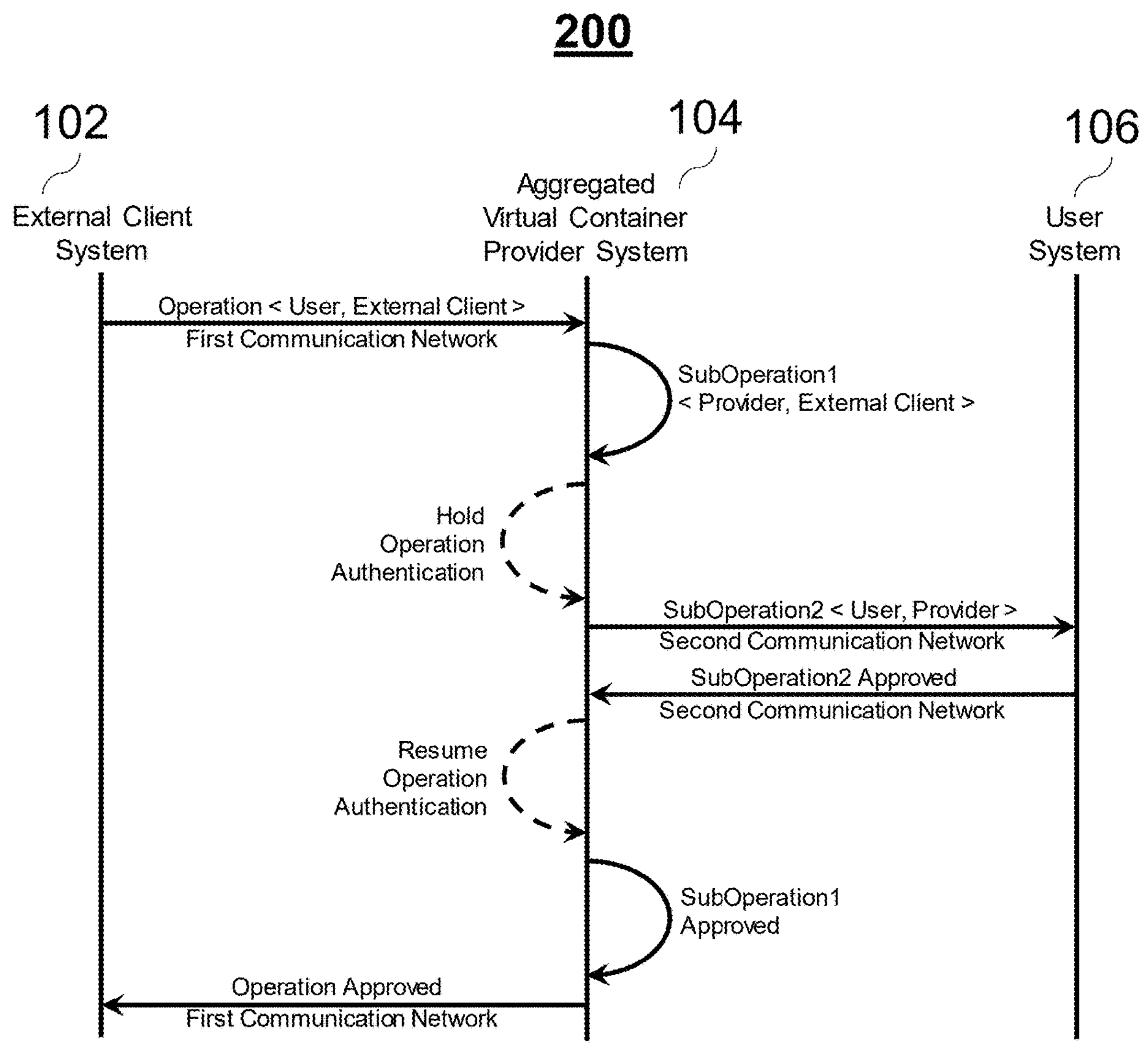
FIG. 2 shows an illustrative data flow diagram for facilitating execution of an operation associated with a user over multiple communication networks, in accordance with one or more embodiments.

FIG. 2 shows illustrative data flow diagram 200 for facilitating execution of an operation associated with a user over multiple communication networks, in accordance with one or more embodiments. Provider system 104 may facilitate an aggregated virtual card implementation capable of executing operations (e.g., transactions) across multiple communication networks (e.g., multiple credit card networks, multiple debit card networks, multiple electronic banking networks, or other suitable networks, or a combination thereof). For example, provider system 104 may facilitate a virtual card network that allows a user (e.g., a consumer) to connect multiple tokens (e.g., multiple payment methods) to a virtual card provided by provider system 104. The virtual card may be associated with a physical authentication token (e.g., a card, a fob, or another suitable form) provided to the user. When the user provides the physical token to external system 102 (e.g., a merchant) for conducting a transaction, the operation initiated at external system 102 may be transmitted over a credit card network to provider system 104. For example, the operation may be executed over the credit card network with the merchant charging the virtual card provider for the transaction. At provider system 104, the operation may be processed to trigger two sequential suboperations. The first suboperation may be triggered to complete the charge from external system 102 (e.g., the merchant) to provider system 104 (e.g., the virtual card provider). The second suboperation may include a payment token (e.g., selected by the consumer, the provider, or another suitable entity) and be executed on an appropriate communication network to user system 106 (e.g., the user system associated with the selected token) with provider system 104 charging the user for the transaction. Final authorization for the transaction to be returned over the credit card network to external system 102 may be put on hold until the second suboperation is complete.

In some embodiments, the aggregated virtual card implementation may allow for intelligently rerouting a transaction to another communication network in case of a technical issue with an initially selected communication network. For example, when the consumer uses the virtual card for a transaction with a merchant, initially the virtual card and associated token reader may trigger the operation for execution on a credit card network with the merchant charging the virtual card provider for the transaction. If the selected credit card network is not available (e.g., offline), then the virtual card and associated token reader may select another credit card network or another suitable communication network for executing the operation. By doing so, the consumer may get the benefit of the transaction being authorized despite the technical issue with the initially selected credit card network. Subsequently, a token (e.g., a payment method) for the consumer connected to the virtual card may be used to execute a suboperation on an appropriate communication network (e.g., a payment network associated with the selected token) with the virtual card provider charging the consumer for the transaction.

In FIG. 2, when the user attempts to use the physical token (e.g., a plastic card) associated with container 108 (e.g., the virtual card) at external system 102 (e.g., the merchant), the user (e.g., the consumer) may not be able to complete the operation if a communication network associated with the physical authentication token is unavailable. For example, access information obtained from the token may be used to initially select a communication network (e.g., a credit card network) and transmit an operation related to the token. However, if the initially selected communication network is unavailable or the associated operation is not acknowledged or executed within a threshold period of time, external system 102 may determine another communication network (e.g., another credit card network) from the access information obtained from the token and transmit the operation for execution. External system 102 may continue this process until, either the operation is executed successfully, or no further communication networks are available from the obtained access information.

In some embodiments, the physical token may include memory (e.g., ROM, EVM chip, etc.) having a primary access information field and a reserve access information field, and the first access information may be obtained from the primary access information field while the second access information may be obtained from the reserve access information field. The reserve access information field may be locked from reading from the memory until a condition is triggered for the physical token. The condition may be triggered for the physical token in response to determining that the operation was not transmitted successfully via the initially selected communication network. Additionally, or alternatively, the condition may be triggered for the physical token after a threshold time period elapses after the primary access information field has been read from the memory.

In FIG. 2, the operation initiated at external system 102 may be transmitted over a credit card network to provider system 104, while a suboperation generated at provider system 104 may be transmitted over an electronic banking network to user system 106. In another example, the operation initiated at external system 102 may be transmitted over a credit card network to provider system 104, while a suboperation generated at provider system 104 may be transmitted over a different credit card network to user system 106. Other variations are possible with respect to multiple credit card networks, multiple debit card networks, multiple electronic banking networks, or other suitable networks and are within the scope of this disclosure.

The physical token associated with container 108 may represent a virtual credit card, a virtual debit card, or another suitable virtual aggregated container. There may be multiple authentication tokens associated with the user (e.g., tokens associated with multiple credit card accounts, debit card accounts, or bank accounts for the user). The physical authentication token (e.g., in the form of a card, a fob, or another suitable form) may be assigned to the user and virtually associated with the multiple authentication tokens for the user (e.g., tokens associated with multiple accounts for the user, such as credit card accounts, bank accounts, payment accounts, or other suitable accounts). When the user attempts to use the physical token (e.g., a virtual credit card issued by provider system 104) at external system 102, an associated operation, Operation <User, External Client>, may be sent from external system 102 to provider system 104. Provider system 104 may receive the operation via the first communication network from external system 102. For example, provider system 104 may receive the operation via a credit card network, a debit card network, an electronic banking network, or another suitable communication network.

At provider system 104, the operation may be split into two suboperations for sequential execution. In particular, provider system 104 may generate sequential suboperations including a first suboperation (e.g., Suboperation1 <Provider, External Client> between provider system 104 and external system 102) and a second suboperation (e.g., Suboperation2 <User, Provider> between the user of container 108 and provider system 104). For example, the first suboperation may result in external system 102 (e.g., the merchant) charging provider system 104 (e.g., the virtual card provider) for the transaction. The second suboperation may result in provider system 104 charging user system 106 (e.g., the user system associated with the user's selected token) for the transaction. By doing so, the merchant may seamlessly receive payment from the user's selected payment method via the virtual card provider without requiring the user or the merchant to handle or even be aware of the transaction being executed over multiple communication networks as this process is seamlessly implemented by the virtual card provider.

In FIG. 2, provider system 104 may execute the first suboperation, and if the first suboperation is executed successfully, transmit the second suboperation via a second communication network (e.g., the same or different communication network as the operation) to user system 106 (e.g., the user system associated with the selected token). For example, the first suboperation may include an authentication instruction for the first suboperation. If the authentication instruction for the first suboperation returns a successful result, the first suboperation may considered to be executed successfully. If an access restriction is in place for the user of container 108 (e.g., the access restriction may be put in place for new users or users that have not satisfied certain criteria for preapproval), the access restriction may require that the second suboperation be executed successfully before an operation approved message may be sent back to external system 102. Therefore, if the first suboperation is executed successfully, provider system 104 may determine whether an access restriction is in place for the user of container 108, and if there is no access restriction in place, provider system 104 may generate a message indicating the operation has been approved (or provisionally approved) and transmit the message via the first communication network to external system 102. However, if an access restriction is found to be in place, provider system 104 may generate a hold request for the operation. The hold request may prevent transmission of any message indicating the operation is approved or executed successfully until confirmation that the second suboperation has been executed successfully. After receiving confirmation that the second suboperation was executed successfully at user system 106, provider system 104 may generate a release request for the operation to allow transmission of the first message indicating that the operation has been executed successfully via the first communication network to external system 102.

In some embodiments, the aggregated virtual card implementation may allow for intelligently selecting from multiple payment methods connected to the virtual card. When a user (e.g., a consumer) uses a physical token (e.g., a plastic card) associated with the virtual card for a transaction with external system 102 (e.g., the merchant), provider system 104 (e.g., the virtual card provider) may automatically select from one of the consumer's payment methods connected to the virtual card according one or more criteria. For example, the consumer may desire to generate a maximum amount of cash back rewards, and the virtual card provider may choose a credit card for the consumer that is appropriate. In another example, the merchant may desire to lower transaction fees, and the virtual card provider may choose a checking account for the consumer that is appropriate. Initially, the operation or transaction may be executed on a credit card network with the merchant charging the virtual card provider for the transaction, and next, the automatically selected payment method may be used to conduct a suboperation or subtransaction on an appropriate communication network with user system 106 (e.g., the user system associated with the selected payment method) with the virtual card provider charging the consumer for the transaction.

In FIG. 2, provider system 104 (e.g., the virtual card provider) may select a token (e.g., a credit card) from a plurality of tokens (e.g., credit cards, debit cards, bank accounts, etc.) connected to container 108 (e.g., the virtual card). For example, provider system 104 may select the token in response to the first suboperation being executed successfully. Provider system 104 may select the token and transmit the second suboperation to user system 106 associated with the selected token. For example, provider system 104 may select a token specified by the user of container 108 prior to receiving the operation (e.g., selected by the user to maximize cash back rewards or another suitable criteria). In another example, provider system 104 may select a token based on at least some information received in the operation (e.g., selected by provider system 104 to match rewards based on product purchased, to minimize fees for provider system 104, or other suitable criteria). In yet another example, provider system 104 may store information regarding tokens that were previously selected but resulted in operation failure (e.g., credit limit exceeded, account not found at user system 106, etc.). In such cases, provider system 104 may select from other remaining tokens according to criteria described with respect to the examples above or other suitable criteria.

The second suboperation may include an authentication token (e.g., a credit card) for a selected user account and be executed at user system 106 associated with the selected user account. If the second suboperation is executed successfully at user system 106 (e.g., transaction is authorized for the selected credit card), provider system 104 may return a message to external system 102 that the operation has been executed successfully. For example, the second suboperation may include an authentication instruction for the second suboperation. The authentication instruction for the second suboperation may be executed at user system 106. If the authentication instruction for the second suboperation returns a successful result, the second suboperation may considered to be executed successfully. The operation may be executed without requiring the user of container 108 or external system 102 initiating the operation to handle or even be aware of the operation being executed over multiple communication networks as this process is seamlessly implemented by provider system 104.

In some embodiments, the proliferation of "Buy Now Pay Later" (BNPL) solutions currently may require a full integration on each merchant's property. Certain merchants may choose to offer certain BNPL vendors and others may not. The availability of certain funding sources, like BNPL, and, if available, the selection of servicers, may be limited. The described systems and methods facilitate virtual cards as a method to leverage existing credit card networks, debit card networks, electronic banking networks, etc. to abstract the underlying funding method, allowing the customer to trigger their preferred solution and vendor. For example, the customer may create a virtual card and select a payment method for the virtual card. For example, a virtual card may point to a loan account, where each transaction is a request for a loan of a defined type. In another example, a virtual card may point to a flex pay account, where each transaction is a request to pay the transaction back in a specified number of installments. In yet another example, virtual cards can point to a bank account where the transaction would run across a credit card network, before making an electronic banking transaction. When the customer provides the merchant with the virtual card, the merchant may conduct the transaction as usual for a credit card transaction. After running through the credit card network, the virtual card may be detokenized and mapped to the funding source at the provider system, as specified when the virtual card was created or at a later time. The virtual card token vault may reside at the network or at an issuer.

In some embodiments, the provider system may set up rules to redirect the transaction to more than one account, possibly owned by more than one individual or entity. For example, a business may set up a rule to pay its suppliers immediately upon sale and implement this contractual obligation through a split payment virtual card number. Additionally, or alternatively, the provider system may provide budgeting tools to leverage loans, installment payments, available bank balance, credit card rewards, and credit card interest rates to optimize a consumer's cost of money and manage cash flow to ensure sufficient emergency fund.

In some embodiments, the virtual card provider may manufacture physical tokens, such as credit cards or fobs, and distribute them to retailers. The physical token may include a virtual card number stored in read-only memory (ROM) of the EMV chip, magnetic stripe, and/or embossed on the physical token. Consumers may buy the inactive, physical token, such as a plastic card, for a fee or obtain them via other suitable means. The consumer may activate the plastic card with the virtual card provider by connecting an account or creating a new account. The account may be a credit card, bank account, brokerage account, etc. The virtual card provider may play the part of a token vault to detokenize the virtual card and map to the underlying account. The virtual card provider may not need to provide anything but mapping for authorization, settlement, chargebacks, and re-presents. Additionally, or alternatively, the virtual card provider may provide a customer service layer, including a mobile application, a website, and customer service, if the underlying account offered API interfaces (e.g., via open banking). Managing the full customer experience in this manner may be analogous to mobile virtual network operators, which market and provide customer service but do not provide network infrastructure to deliver mobile phone service.

In some embodiments, the virtual card provider may be the merchant of record but may enter into an agreement with the underlying account connected by the user, so that it would not suffer any liability in the event of fraud. The underlying account may allow incoming transactions via an associated processor core through a new connection, or the virtual card provider may detokenize and return the transaction into the relevant communication network (e.g., a payment network) before being passed to the associated processor. Further, the virtual card provider may route transactions to multiple underlying accounts. The routing may be accomplished based on customer preferences set up in advance or transaction by transaction. For example, it does not have to be immediate if the virtual card provider is willing to manage the financial risk or has the right to fallback to a default funding mechanism if the user does not take action. The virtual card provider may allow selection of the funding account based on what would best optimize rewards, optimize interchange, or manage cash flow. The virtual card provider may capture a portion of interchange in exchange for driving new accounts to the business owner of the underlying account. Finally, separating the credit card sale from the issuer may result in the credit card not needing to carry the issuer's branding and could be an object of fashion and status. The materials, design, personalization, customization, etc. for the plastic card may be varied to meet the tastes of the consumer.

Figure 3:
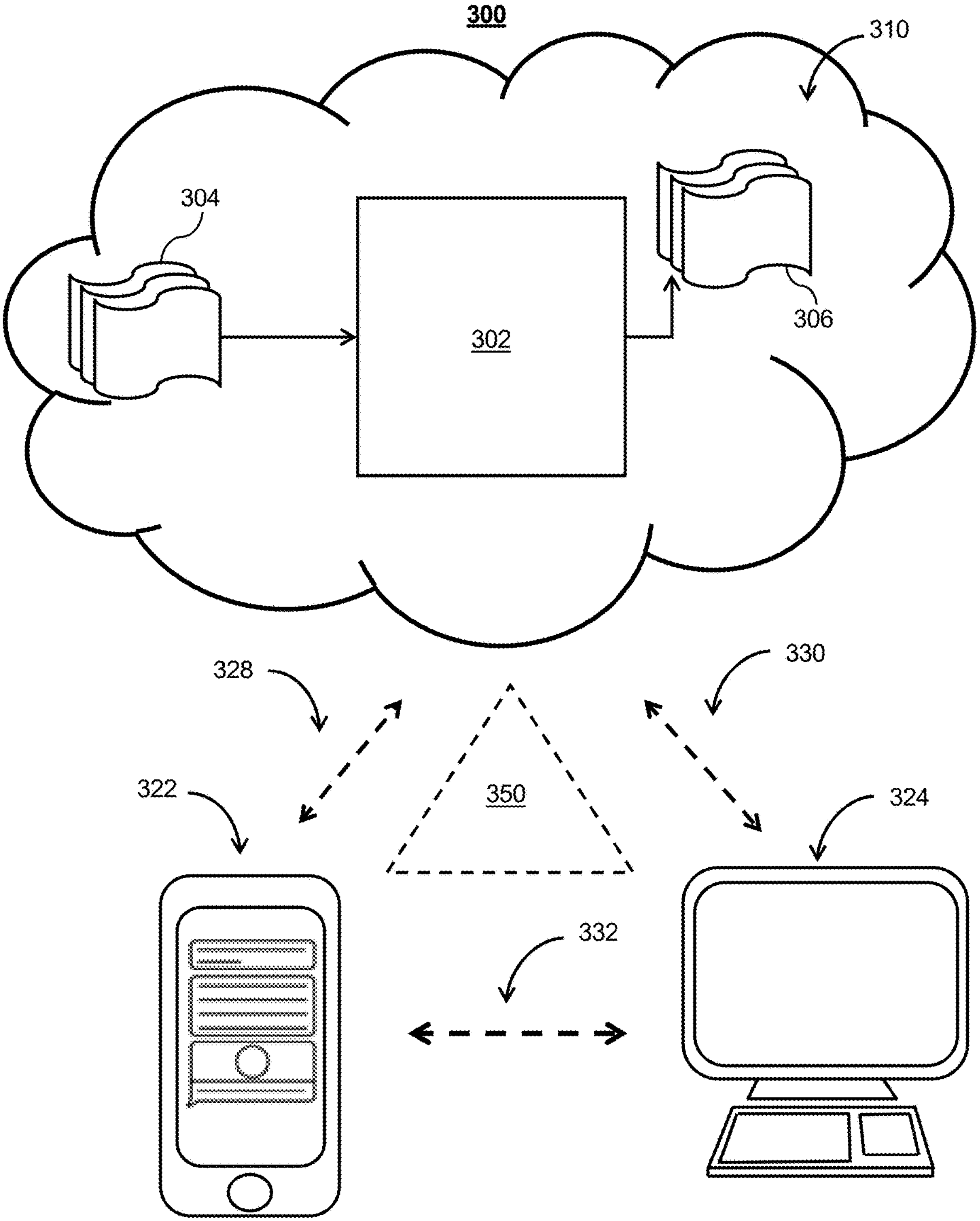
FIG. 3 is an illustrative architecture for a system for facilitating execution of an operation associated with a user over multiple communication networks, in accordance with one or more embodiments.

FIG. 3 is an illustrative architecture for system 300 for facilitating execution of an operation associated with a user over multiple communication networks, in accordance with one or more embodiments. As shown in FIG. 3, system 300 may include mobile device 322 and user terminal 324 (either type of device may be a "user device" as referred to herein, though a user device may additionally or alternatively include other types of devices as well). While shown as a smartphone and a personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., based on output data received from system 300).

Additionally, as mobile device 322 is shown as a touchscreen smartphone, this display also acts as a user input interface. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic database query responses using ensemble prediction by correlating probability models with non-homogenous time dependencies to generate time-specific data processing predictions.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communication networks or combinations of communication networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a server 302 for implementing one or more embodiments described with respect to FIGS. 1 and 2. For example, server 302 may implement a portion or all of external system 102, provider system 104, or user system 106. Server 302 may receive input data 304 from mobile device 322 (e.g., a token reader), execute the operation to process the input data 304, and transmit output data 306 to user terminal 324 (e.g., a merchant terminal), or vice versa. Cloud components 310 may also include control circuitry configured to perform the various operations needed to facilitate execution of an operation associated with a user over multiple communication networks, according to one or more embodiments.

In some embodiments, cloud components 310 include an artificial intelligence model. The artificial intelligence model may take inputs and provide outputs. The inputs may include multiple datasets, such as a training dataset and a test dataset. In some embodiments, the outputs may be fed back to the artificial intelligence model as input to train the artificial intelligence model (e.g., alone or in conjunction with user indications of the accuracy of the outputs, with labels associated with the inputs, or with other reference feedback information). For example, the system may receive a first labeled feature input, wherein the first labeled feature input is labeled with a known prediction for the first labeled feature input. The system may then train the artificial intelligence model to classify the first labeled feature input with the known prediction.

In another embodiment, the artificial intelligence model may update its configurations (e.g., weights, biases, or other parameters) based on the assessment of its prediction and reference feedback information (e.g., user indication of accuracy, reference labels, or other information). In another embodiment, where the artificial intelligence model is a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the artificial intelligence model may be trained to generate better predictions.

In some embodiments, the artificial intelligence model may include an artificial neural network. In such embodiments, the artificial intelligence model may include an input layer and one or more hidden layers. Each neural unit of the artificial intelligence model may be connected with many other neural units of the artificial intelligence model. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. The artificial intelligence model may be self-learning and trained, rather than explicitly programmed, and can perform significantly better in certain areas of problem solving as compared to traditional computer programs. During training, an output layer of the artificial intelligence model may correspond to a classification of the artificial intelligence model, and an input known to correspond to that classification may be input into an input layer of the artificial intelligence model during training. During testing, an input without a known classification may be input into the input layer, and a determined classification may be output.

In some embodiments, the artificial intelligence model may include multiple layers (e.g., where a signal path traverses from front layers to back layers). In some embodiments, backpropagation techniques may be utilized by the artificial intelligence model where forward stimulation is used to reset weights on the "front" neural units. In some embodiments, stimulation and inhibition for the artificial intelligence model may be more free-flowing, with connections interacting in a more chaotic and complex fashion. During testing, an output layer of the artificial intelligence model may indicate whether or not a given input corresponds to a classification of the artificial intelligence model.

System 300 also includes application programming interface (API) layer 350. API layer 350 may allow the system to communicate across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 100 may be partially based on API layer 350, such that there is strong adoption of SOAP and RESTful Web services, using resources like Service Repository and Developer Portal, but with low governance, standardization, and separation of concerns. Alternatively, system 100 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between the Front-End Layer and the Back-End Layer. In such cases, API layer 350 may use RESTful APIs (exposition to front-end or event communication between microservices). API layer 350 may use AMQP (e.g., Kafka, RabbitMQ, etc.). API layer 350 may use incipient usage of new communication protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDoS protection, and API layer 350 may use RESTful APIs as standard for external integration.

FIG. 4 shows a flowchart of the steps involved in executing an operation over multiple communication networks, in accordance with one or more embodiments. For example, process 400 may represent the steps taken by one or more devices as shown in FIGS. 1-3.

At step 402, process 400 (e.g., using one or more components in system 300 (FIG. 3)) may receive, via a first communication network, from an external system, an operation related to an aggregated virtual container. The operation may be associated with a user of the aggregated virtual container and the external system. For example, a virtual card provider (e.g., provider system 104 or another suitable system) may receive, via a first communication network (e.g., a credit card network, a debit card network, an electronic banking network, etc.), from an external system (e.g., a merchant or another suitable entity interacting with the user), an operation (e.g., a transaction or another suitable operation) related to an aggregated virtual container (e.g., a virtual card or another suitable container). In some embodiments, the aggregated virtual container may be associated with a physical authentication token (e.g., a card, a fob, or another suitable form) provided to the user (e.g., the consumer or another suitable user of the aggregated virtual container).

At step 404, process 400 may, based on the operation, generate sequential suboperations including a first suboperation associated with a provider of the aggregated virtual container and the external system and a second suboperation associated with the user and the provider of the aggregated virtual container. For example, the virtual card provider (e.g., provider system 104 or another suitable system) may, based on the operation (e.g., the transaction or another suitable operation), generate sequential suboperations (e.g., subtransactions related to the transaction) including a first suboperation associated with a provider (e.g., provider system 104 or another suitable system) of the aggregated virtual container (e.g., container 108 or another suitable container) and the external system (e.g., the merchant or another suitable entity interacting with the user) and a second suboperation associated with the user (e.g., the consumer or another suitable user of the aggregated virtual container) and the provider of the aggregated virtual container.

At step 406, process 400 may execute the first suboperation including a first authentication instruction for the first suboperation. For example, the virtual card provider (e.g., provider system 104 or another suitable system) may execute the first suboperation (e.g., Suboperation1 <Provider, External Client> associated with provider system 104 and external system 102) including a first authentication instruction for the first suboperation. The first suboperation may result in external system 102 (e.g., the merchant or another suitable entity interacting with the user) charging provider system 104 (e.g., the virtual card provider) for the transaction.

At step 408, process 400 may, in response to the first authentication instruction being successful, transmit via a second communication network, to a user system associated with the aggregated virtual container, the second suboperation. The second suboperation may include a second authentication instruction for the second suboperation. For example, the virtual card provider (e.g., provider system 104 or another suitable system) may transmit the second suboperation (e.g., Suboperation2 <User, Provider> associated with provider system 104 and external system 102) via a second communication network (e.g., a credit card network, a debit card network, an electronic banking network, etc.), which is different from the first communication network.

At step 410, process 400 may receive, via the second communication network, from the user system, an indication that the second authentication instruction was successful. For example, the virtual card provider (e.g., provider system 104 or another suitable system) may receive via the second communication network (e.g., a credit card network, a debit card network, an electronic banking network, etc.), from the user system (e.g., user system 106 associated with the user's selected token or another suitable system), an indication that the second authentication instruction was successful. The second suboperation may result in provider system 104 charging user system 106 (e.g., associated with the user's selected token or another suitable system) for the transaction.

At step 412, process 400 may, in response to the second authentication instruction being successful, generate a first message indicating that the operation has been executed and transmit the first message via the first communication network to the external system. For example, the virtual card provider (e.g., provider system 104 or another suitable system) may, in response to the second authentication instruction being successful, generate a first message (e.g., operation approved or another suitable message) indicating that the operation has been executed and transmit the first message via the first communication network (e.g., a credit card network, a debit card network, an electronic banking network, etc.) to the external system (e.g., external system 102, the merchant or another suitable entity interacting with the user). By doing so, the merchant may seamlessly receive payment from the user's selected payment method via the virtual card provider without requiring the user or the merchant to handle or even be aware of the transaction being executed over multiple communication networks as this process is seamlessly implemented by the virtual card provider.

In some embodiments, if an access restriction is in place for the user of the virtual aggregated container (e.g., the access restriction may be put in place for new users or users that have not satisfied certain criteria for preapproval), the access restriction may require that the second suboperation be executed successfully before an operation approved message may be sent back to external system 102. Therefore, if the first suboperation is executed successfully, provider system 104 may determine whether an access restriction is in place for the user of container 108, and if there is no access restriction in place, provider system 104 may generate a message indicating the operation has been approved (or provisionally approved) and transmit the message via the first communication network to external system 102. However, if an access restriction is found to be in place, provider system 104 may generate a hold request for the operation. The hold request may prevent transmission of any message indicating the operation is approved or executed successfully until confirmation that the second suboperation has been executed successfully. After receiving confirmation that the second suboperation was executed successfully at user system 106, provider system 104 may generate a release request for the operation to allow transmission of the first message indicating that the operation has been executed successfully via the first communication network to external system 102.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
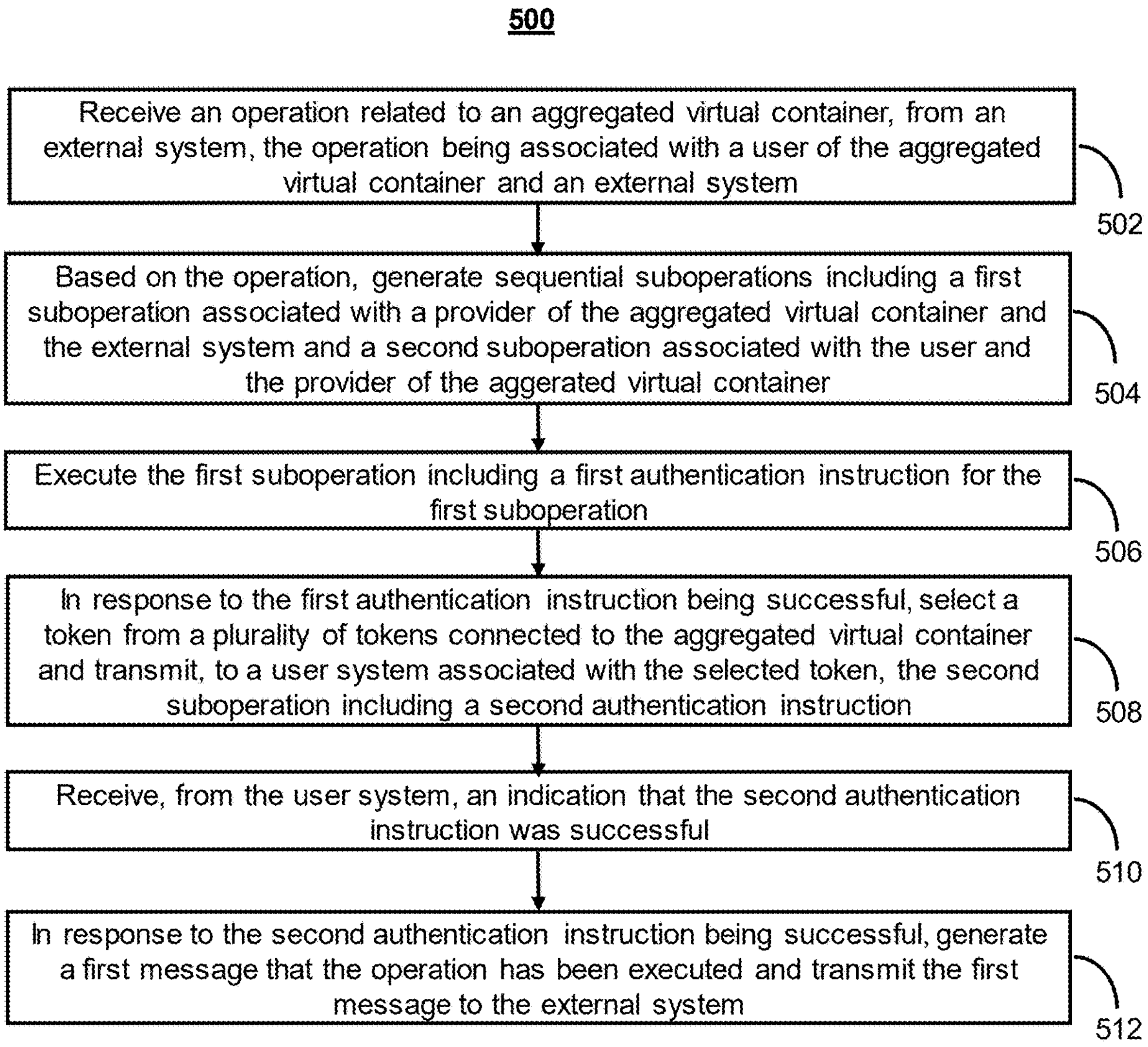
FIG. 5 shows a flowchart of the steps involved in executing sequential suboperations at an aggregated virtual container provider system, in accordance with one or more embodiments.

FIG. 5 shows a flowchart of the steps involved in executing sequential suboperations at an aggregated virtual container provider system, in accordance with one or more embodiments. For example, process 500 may represent the steps taken by one or more devices as shown in FIGS. 1-3.

At step 502, process 500 (e.g., using one or more components in system 300 (FIG. 3)) may receive an operation related to an aggregated virtual container. The operation may be associated with a user of the aggregated virtual container and an external system. For example, the virtual card provider (e.g., provider system 104 or another suitable system) may receive, from an external system (e.g., a merchant or another suitable entity interacting with the user), an operation (e.g., a transaction or another suitable operation) related to an aggregated virtual container (e.g., a virtual card or another suitable container). In some embodiments, the aggregated virtual container may be associated with a physical authentication token (e.g., a card, a fob, or another suitable form) provided to the user (e.g., the consumer or another suitable user of the aggregated virtual container).

At step 504, process 500 may, based on the operation, generate sequential suboperations including a first suboperation associated with a provider of the aggregated virtual container and the external system and a second suboperation associated with the user and the provider of the aggregated virtual container. For example, the virtual card provider (e.g., provider system 104 or another suitable system) may, based on the operation, generate sequential suboperations including a first suboperation associated with a provider of the aggregated virtual container and the external system and a second suboperation associated with the user and the provider of the aggregated virtual container. For example, the virtual card provider (e.g., provider system 104 or another suitable system) may, based on the operation (e.g., the transaction or another suitable operation), generate sequential suboperations (e.g., subtransactions related to the transaction) including a first suboperation associated with a provider (e.g., provider system 104 or another suitable system) of the aggregated virtual container (e.g., container 108 or another suitable container) and the external system (e.g., the merchant or another suitable entity interacting with the user) and a second suboperation associated with the user (e.g., the consumer or another suitable user of the aggregated virtual container) and the provider of the aggregated virtual container.

At step 506, process 500 may execute the first suboperation including a first authentication instruction for the first suboperation. For example, the virtual card provider (e.g., provider system 104 or another suitable system) may execute the first suboperation including a first authentication instruction for the first suboperation. For example, the virtual card provider (e.g., provider system 104 or another suitable system) may execute the first suboperation (e.g., Suboperation1 <Provider, External Client> associated with provider system 104 and external system 102) including a first authentication instruction for the first suboperation. The first suboperation may result in external system 102 (e.g., the merchant or another suitable entity interacting with the user) charging provider system 104 (e.g., the virtual card provider) for the transaction.

At step 508, process 500 may, in response to the first authentication instruction being successful, select a token from a plurality of tokens connected to the aggregated virtual container and transmit, to a user system associated with the selected token, the second suboperation including a second authentication instruction for the second suboperation. For example, the virtual card provider (e.g., provider system 104 or another suitable system) may, in response to the first authentication instruction being successful, select a token (e.g., a credit card) from a plurality of tokens (e.g., credit cards, debit cards, bank accounts, etc.) connected to the aggregated virtual container (e.g., the consumer or another suitable user of the aggregated virtual container). The virtual card provider may transmit to a user system (e.g., user system 106 associated with the user's selected token or another suitable system), associated with the selected token, the second suboperation including a second authentication instruction for the second suboperation. For example, provider system 104 may select a token specified by the user of container 108 prior to receiving the operation (e.g., selected by the user to maximize cash back rewards or another suitable criteria). In another example, provider system 104 may select a token based on at least some information received in the operation (e.g., selected by provider system 104 to match rewards based on product purchased, to minimize fees for provider system 104, or other suitable criteria). In yet another example, provider system 104 may store information regarding tokens that were previously selected but resulted in operation failure (e.g., credit limit exceeded, account not found at user system 106, etc.). In such cases, provider system 104 may select from other remaining tokens according to criteria described with respect to the examples above or other suitable criteria. In some instances, provider system 104 may use a machine learning model (e.g., as described with respect to FIG. 3) to select a token from the plurality of tokens. Provider system 104 may provide input including the operation, the user's connected tokens, history of prior user operations, history of prior provider system operations, etc. to the machine learning model in order to obtain an output identifying the token to be selected from the plurality of tokens.

At step 510, process 500 may receive, from the user system, an indication that the second authentication instruction was successful. For example, the virtual card provider (e.g., provider system 104 or another suitable system) may receive via the second communication network (e.g., a credit card network, a debit card network, an electronic banking network, etc.), from the user system (e.g., user system 106 associated with the user's selected token or another suitable system), an indication that the second authentication instruction was successful. The second suboperation may result in provider system 104 charging user system 106 (e.g., associated with the user's selected token or another suitable system) for the transaction.

At step 512, process 500 may, in response to the second authentication instruction being successful, generate a first message that the operation has been executed and transmit the first message to the external system. For example, the virtual card provider (e.g., provider system 104 or another suitable system) may, in response to the second authentication instruction being successful, generate a first message (e.g., operation approved or another suitable message) indicating that the operation has been executed and transmit the first message via the first communication network (e.g., a credit card network, a debit card network, an electronic banking network, etc.) to the external system (e.g., external system 102, the merchant or another suitable entity interacting with the user). By doing so, the operation is executed without requiring the user or another entity to provide input regarding which authentication token to select at the time of executing the operation at the provider system.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

Figure 6:
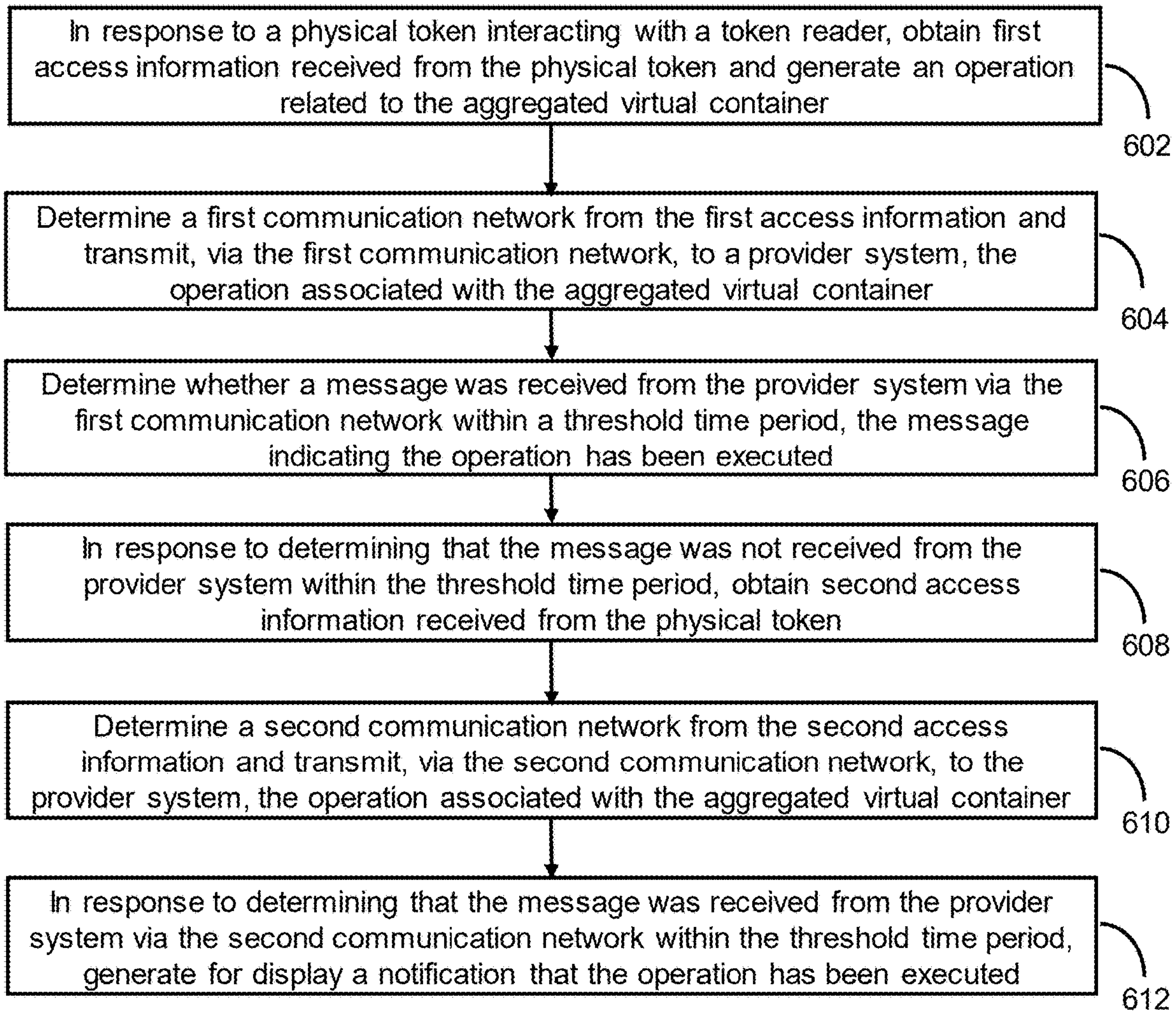
FIG. 6 shows a flowchart of the steps involved in successively executing an operation over multiple communication networks, in accordance with one or more embodiments.

FIG. 6 shows a flowchart of the steps involved in successively executing an operation over multiple communication networks, in accordance with one or more embodiments. For example, process 600 may represent the steps taken by one or more devices as shown in FIGS. 1-3.

At step 602, process 600 (e.g., using one or more components in system 300 (FIG. 3)) may, in response to a physical token interacting with a token reader, obtain first access information received from the physical token and generate an operation related to the aggregated virtual container. The operation may be associated with a user of the aggregated virtual container and the external system. For example, the system may, in response to a physical token (e.g., a plastic card, a fob, or another suitable form) interacting with a token reader (e.g., a card machine, an NFC terminal, an RFID terminal, etc.), obtain first access information (e.g., network information for a credit card network, a debit card network, an electronic banking network, etc.) received from the physical token and generate an operation (e.g., a transaction or another suitable operation) related to the aggregated virtual container (e.g., a virtual card or another suitable container).

At step 604, process 600 may determine a first communication network from the first access information and transmit, via the first communication network, to a provider system associated with the aggregated virtual container, the operation associated with the aggregated virtual container. For example, the system may determine a first communication network (e.g., a credit card network, a debit card network, an electronic banking network, etc.) from the first access information (e.g., network information) and transmit, via the first communication network, to a provider system (e.g., a virtual card provider or another suitable system) associated with the aggregated virtual container (e.g., a virtual card or another suitable container), the operation (e.g., the transaction or another suitable operation) associated with the aggregated virtual container.

At step 606, process 600 may determine whether a message was received from the provider system within a threshold time period. The message may indicate that the operation has been executed. For example, the system may determine whether a message (e.g., operation approved, provisionally approved, acknowledged, etc.) was received from the provider system (e.g., a virtual card provider or another suitable system) within a threshold time period (e.g., within a few milliseconds, a few seconds, or another suitable threshold). The user (e.g., the consumer) may not be able to complete the operation if a communication network associated with the physical token is unavailable.

At step 608, process 600 may, in response to determining that the message was not received from the provider system via the first communication network within the threshold time period, obtain second access information received from the physical token. For example, the system may, in response to determining that the message (e.g., operation approved, provisionally approved, acknowledged, etc.) was not received from the provider system (e.g., a virtual card provider or another suitable system) via the first communication network (e.g., a credit card network, a debit card network, an electronic banking network, etc.) within the threshold time period (e.g., within a few milliseconds, a few seconds, or another suitable threshold), obtain second access information (e.g., network information) received from the physical token (e.g., a plastic card, a fob, or another suitable form).

At step 610, process 600 may determine a second communication network from the second access information and transmit, via the second communication network, to the provider system, the operation associated with the aggregated virtual container. For example, the system may determine a second communication network (e.g., a credit card network, a debit card network, an electronic banking network, etc.) from the second access information (e.g., network information) and transmit, via the second communication network, to the provider system (e.g., a virtual card provider or another suitable system), the operation (e.g., transaction) associated with the aggregated virtual container (e.g., a virtual card or another suitable container). If the initially selected communication network is unavailable or the associated operation is not acknowledged or executed within a threshold period of time, external system 102 may determine another communication network (e.g., another credit card network) from the access information.

At step 612, process 600 may, in response to determining that the message was received from the provider system via the second communication network within the threshold time period, generate for display at the token reader a notification that the operation has been executed. For example, the system may, in response to determining that the message (e.g., operation approved, provisionally approved, acknowledged, etc.) was received from the provider system (e.g., a virtual card provider or another suitable system) via the second communication network (e.g., a credit card network, a debit card network, an electronic banking network, etc.) within the threshold time period (e.g., within a few milliseconds, a few seconds, or another suitable threshold), generate for display at the token reader (e.g., a card machine, an NFC terminal, an RFID terminal, etc.) a notification that the operation has been executed. By doing so, the consumer may get the benefit of the transaction being authorized despite the technical issue with the initially selected credit card network.

In some embodiments, the physical token may include memory (e.g., ROM, EVM chip, etc.) having a primary access information field and a reserve access information field, and the first access information may be obtained from the primary access information field while the second access information may be obtained from the reserve access information field. The reserve access information field may be locked from reading from the memory until a condition is triggered for the physical token. The condition may be triggered for the physical token in response to determining that the operation was not transmitted successfully via the initially selected communication network. Additionally, or alternatively, the condition may be triggered for the physical token after a threshold time period elapses after the primary access information field has been read from the memory.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for executing sequential suboperations over multiple communication networks will be better understood with reference to the following enumerated embodiments:

1. A method comprising: receiving, via a first communication network, from an external system, an operation related to an aggregated virtual container, the operation being associated with a user of the aggregated virtual container and the external system; based on the operation, generating sequential suboperations including a first suboperation associated with a provider of the aggregated virtual container and the external system and a second suboperation associated with the user and the provider of the aggregated virtual container; executing the first suboperation including a first authentication instruction for the first suboperation; in response to the first authentication instruction being successful, transmitting via a second communication network, to a user system associated with the aggregated virtual container, the second suboperation including a second authentication instruction for the second suboperation; receiving, via the second communication network, from the user system, an indication that the second authentication instruction was successful; and in response to the second authentication instruction being successful, generating a first message indicating that the operation has been executed and transmitting the first message via the first communication network to the external system.
2. A method comprising: receiving, via a first communication network, from an external system, an operation related to an aggregated virtual container, the operation being associated with a user of an aggregated virtual container and the external system; based on the operation, generating sequential suboperations including a first suboperation associated with a provider of the aggregated virtual container and the external system and a second suboperation associated with the user and the provider of the aggregated virtual container; in response to the first suboperation being executed successfully, determining whether an access restriction is in place for the user with respect to the aggregated virtual container; in response to determining that an access restriction is not in place for the user, transmitting the second suboperation to a user system associated with the aggregated virtual container; receiving, from the user system, an indication that the second suboperation was successfully executed; and in response to the second suboperation being executed successfully, generating a first message indicating that the operation has been executed and transmitting the first message via the first communication network to the external system.

3. A method comprising: receiving, via a first communication network, from an external system, an operation related to an aggregated virtual container, the operation being associated with a user of the aggregated virtual container and the external system; based on the operation, generating sequential suboperations including a first suboperation associated with a provider of the aggregated virtual container and the external system and a second suboperation associated with the user and the provider of the aggregated virtual container; in response to the first suboperation being executed successfully, transmitting the second suboperation to a user system associated with the aggregated virtual container; receiving, from the user system, an indication that the second suboperation was successfully executed; and in response to the second suboperation being executed successfully, generating a first message indicating that the operation has been executed and transmitting the first message via the first communication network to the external system.

4. The method of any one of the preceding embodiments, further comprising transmitting the second suboperation and receiving the indication that the second suboperation was successfully executed via a second communication network.

5. The method of any one of the preceding embodiments, further comprising transmitting the second suboperation and receiving the indication that the second suboperation was successfully executed via a second communication network different from the first communication network.

6. The method of any one of the preceding embodiments, wherein the aggregated virtual container is associated with a plurality of tokens, and wherein the second suboperation is associated with a token selected from the plurality of tokens.

7. The method of any one of the preceding embodiments, wherein the user system is associated with the token selected from the plurality of tokens.

8. The method of any one of the preceding embodiments, further comprising: in response to the first suboperation being executed successfully, determining whether an access restriction is in place for the user with respect to the aggregated virtual container.

9. The method of any one of the preceding embodiments, further comprising: in response to determining that an access restriction is not in place for the user, prior to transmitting the second suboperation, generating a second message indicating that the operation has been provisionally executed and transmitting the second message via the first communication network to the external system.

10. The method of any one of the preceding embodiments, further comprising: in response to determining that an access restriction is in place for the user, generating a hold request for the operation, thereby preventing transmission of the first message indicating that the operation has been executed via the first communication network to the external system.

11. The method of any one of the preceding embodiments, further comprising: in response to the second suboperation being executed successfully, generating a release request for the operation, thereby allowing transmission of the first message indicating that the operation has been executed via the first communication network to the external system.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

The present techniques for executing sequential suboperations at an aggregated virtual container provider system will be better understood with reference to the following enumerated embodiments:

1. A method comprising: receiving an operation related to an aggregated virtual container, the operation being associated with a user of the aggregated virtual container and an external system; based on the operation, generating sequential suboperations including a first suboperation associated with a provider of the aggregated virtual container and the external system and a second suboperation associated with the user and the provider of the aggregated virtual container; executing the first suboperation including a first authentication instruction for the first suboperation; in response to the first authentication instruction being successful, selecting a token from a plurality of tokens connected to the aggregated virtual container and transmitting, to a user system associated with the selected token, the second suboperation including a second authentication instruction for the second suboperation; receiving, from the user system, an indication that the second authentication instruction was successful; and in response to the second authentication instruction being successful, generating a first message that the operation has been executed and transmitting the first message to the external system.

2. A method comprising: in response to receiving an operation related to an aggregated virtual container, generating sequential suboperations including a first suboperation associated with a provider of the aggregated virtual container and an external system and a second suboperation associated with a user of the aggregated virtual container and a provider of the aggregated virtual container; in response to the first suboperation being executed successfully, selecting a token from a plurality of tokens connected to the aggregated virtual container and transmitting, to a user system associated with the selected token, the second suboperation including a second authentication instruction for the second suboperation; and in response to the second suboperation being executed successfully, generating a first message that the operation has been executed and transmitting the first message to the external system.

3. A method comprising: based on an operation related to an aggregated virtual container, generating sequential suboperations including a first suboperation associated with a provider of the aggregated virtual container and an external system and a second suboperation associated with a user of the aggregated virtual container and the provider of the aggregated virtual container, the first suboperation including a first authentication instruction for the first suboperation; in response to the first authentication instruction being successful, selecting a token from a plurality of tokens connected to the aggregated virtual container and transmitting, to a user system associated with the selected token, the second suboperation including a second authentication instruction for the second suboperation; and in response to the second authentication instruction being successful, generating a first message that the operation has been executed and transmitting the first message to the external system.
4. The method of any one of the preceding embodiments, further comprising: executing, at the provider of the aggregated virtual container, the first suboperation including the first authentication instruction for the first suboperation; and receiving, from the provider of the aggregated virtual container, an indication that the second authentication instruction was successful.
5. The method of any one of the preceding embodiments, further comprising: executing, at the user system, the second suboperation including the second authentication instruction for the second suboperation; and receiving, from the user system, an indication that the second authentication instruction was successful.
6. The method of any one of the preceding embodiments, wherein selecting the token from a plurality of tokens connected to the aggregated virtual container comprises selecting a token specified by the user of the aggregated virtual container prior to receiving the operation.
7. The method of any one of the preceding embodiments, wherein selecting the token from a plurality of tokens connected to the aggregated virtual container comprises determining a token based on at least some information received in the operation.
8. The method of any one of the preceding embodiments, further comprising receiving, via a first communication network, from an external system, the operation related to the aggregated virtual container.
9. The method of any one of the preceding embodiments, further comprising transmitting the second suboperation and receiving an indication that the second suboperation was successfully executed via a second communication network.
10. The method of any one of the preceding embodiments, further comprising transmitting the second suboperation and receiving an indication that the second suboperation was successfully executed via a second communication network different from the first communication network.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

The present techniques for successively executing an operation over multiple communication networks will be better understood with reference to the following enumerated embodiments:

1. A method comprising: in response to a physical token interacting with a token reader, obtaining first access information received from the physical token and generating an operation related to the aggregated virtual container, the operation being associated with a user of the aggregated virtual container and the external system; determining a first communication network from the first access information and transmitting, via the first communication network, to a provider system associated with the aggregated virtual container, the operation associated with the aggregated virtual container; determining whether a message was received from the provider system within a threshold time period, the message indicating that the operation has been executed; in response to determining that the message was not received from the provider system via the first communication network within the threshold time period, obtaining second access information received from the physical token; determining a second communication network from the second access information and transmitting, via the second communication network, to the provider system, the operation associated with the aggregated virtual container; and in response to determining that the message was received from the provider system via the second communication network within the threshold time period, generating for display at the token reader a notification that the operation has been executed.
2. A method comprising: obtaining first access information received from a physical token and generating an operation related to an aggregated virtual container; determining a first communication network from the first access information and transmitting, via the first communication network, the operation associated with the aggregated virtual container; in response to determining that the operation was not transmitted successfully via the first communication network, obtaining second access information received from the physical token; determining a second communication network from the second access information and transmitting, via the second communication network, the operation associated with the aggregated virtual container; and in response to determining that the operation was transmitted successfully via the second communication network, generating for display a notification that the operation has been executed.
3. A method comprising: obtaining first access information received from a physical token and an operation related to an aggregated virtual container; determining a first communication network from the first access information and transmitting, via the first communication network, the operation associated with the aggregated virtual container; based on determining that the operation was not transmitted successfully via the first communication network, obtaining second access information received from the physical token; determining a second communication network from the second access information and transmitting, via the second communication network, the operation associated with the aggregated virtual container; and based on determining that the operation was transmitted successfully via the second communication network, generating for display a notification that the operation has been executed.

4. The method of any one of the preceding embodiments, wherein the physical token includes memory having a primary access information field and a reserve access information field, wherein the first access information is obtained from the primary access information field, and wherein the second access information is obtained from the reserve access information field.

5. The method of any one of the preceding embodiments, wherein the primary access information field and the reserve access information field are simultaneously available for reading from the memory.

6. The method of any one of the preceding embodiments, wherein the reserve access information field is locked from reading from the memory until a condition is triggered for the physical token.

7. The method of any one of the preceding embodiments, wherein the condition is triggered for the physical token in response to determining that the operation was not transmitted successfully via the first communication network.

8. The method of any one of the preceding embodiments, wherein the condition is triggered for the physical token after a threshold time period elapses after the primary access information field has been read from the memory.

9. The method of any one of the preceding embodiments, wherein the operation is transmitted via the first communication network to a provider system associated with the aggregated virtual container.

10. The method of any one of the preceding embodiments, further comprising determining whether a message was received from the provider system via the first communication network within a threshold time period, the message indicating that the operation has been executed.

11. The method of any one of the preceding embodiments, wherein the second access information from the physical token is obtained in response to determining that the message was not received from the provider system via the first communication network within the threshold time period.

12. The method of any one of the preceding embodiments, further comprising determining whether the message was received from the provider system via the second communication network within the threshold time period.

13. The method of any one of the preceding embodiments, wherein the notification that the operation has been executed is generated for display in response to determining that the message was received from the provider system via the second communication network within the threshold time period.

14. A tangible, non-transitory, machine-readable medium storing instructions that, when executed by a data processing apparatus, cause the data processing apparatus to perform operations comprising those of any of embodiments 1-13.

15. A system comprising: one or more processors; and memory storing instructions that, when executed by the processors, cause the processors to effectuate operations comprising those of any of embodiments 1-13.

16. A system comprising means for performing any of embodiments 1-13.

What is claimed is:

1. A system for executing sequential suboperations over multiple communication networks, the system comprising:

memory; and one or more processors configured to cause the system to:

receive, via a first communication network and from an external system, an operation related to an aggregated virtual container based on a user attempting to use a physical authentication token, associated with the aggregated virtual container, at the external system;

generate, based on the operation, sequential suboperations including:

a first suboperation between a provider of the aggregated virtual container and the external system, and a second suboperation between the user and the provider of the aggregated virtual container;

execute the first suboperation;

transmit, via a second communication network and based on the first suboperation being executed successfully, the second suboperation to a user system associated with the aggregated virtual container;

receive, from the user system, an indication that the second suboperation was successfully executed;

generate, based on the indication that the second suboperation was successfully executed, a message indicating that the operation has been approved; and transmit, via the first communication network and to the external system, the message indicating that the operation has been approved.

2. The system of claim 1, wherein the one or more processors are further configured to cause the system to:

generate, based on an access restriction not being in place for the user with respect to the aggregated virtual container and prior to transmitting the second suboperation, a different message indicating that the operation has been provisionally executed; and transmit the different message via the first communication network to the external system.

3. The system of claim 1, wherein the one or more processors are further configured to cause the system to:

generate, based on an access restriction being in place for the user, a hold request for the operation; and generate, based on the indication that the second suboperation was successfully executed, a release request that allows transmission of the message indicating that the operation has been approved.

4. A method, comprising:

receiving, via a first communication network and from an external system, an operation related to an aggregated virtual container;

generating, based on the operation, sequential suboperations including:

a first suboperation between a provider of the aggregated virtual container and the external system, and a second suboperation;

executing the first suboperation;

transmitting, via a second communication network and based on the first suboperation being executed successfully, the second suboperation to a user system associated with the aggregated virtual container;

receiving, from the user system, an indication that the second suboperation was successfully executed;

generating, based on the indication that the second suboperation was successfully executed, a message indicating that the operation has been approved; and transmitting, via the first communication network and to the external system, the message indicating that the operation has been approved.

5. The method of claim 4, wherein the indication that the second suboperation was successfully executed is received via the second communication network.

6. The method of claim 4, wherein the second communication network is different from the first communication network.

7. The method of claim 4,
wherein the aggregated virtual container is associated with a plurality of tokens, and
wherein the second suboperation is associated with a token selected from the plurality of tokens.

8. The method of claim 7, wherein the user system is associated with the token selected from the plurality of tokens.

9. The method of claim 4, further comprising:
determining, based on the first suboperation being executed successfully, whether an access restriction is in place for a user with respect to the aggregated virtual container.

10. The method of claim 9, further comprising:
generating, based on determining that the access restriction is not in place for the user and prior to transmitting the second suboperation, a different message indicating that the operation has been approved; and
transmitting the different message via the first communication network to the external system.

11. The method of claim 9, further comprising:
generating, based on determining that the access restriction is in place for the user, a hold request to prevent transmission of the message to the external system.

12. The method of claim 11, further comprising:
generating, based on the second suboperation being executed successfully, a release request to allow transmission of the message to the external system.

13. One or more non-transitory, computer-readable media comprising instructions that, when executed by one or more processors, cause operations comprising:
receiving, from an external system, an operation related to an aggregated virtual container;
generating, based on the operation, sequential suboperations including:
a first suboperation between a provider of the aggregated virtual container and the external system, and
a second suboperation between a user and the provider of the aggregated virtual container;
executing the first suboperation;
transmitting, based on the first suboperation being executed successfully, the second suboperation to a user system associated with the aggregated virtual container;
receiving, from the user system, an indication that the second suboperation was successfully executed;
generating, based on the indication that the second suboperation was successfully executed, a message indicating that the operation has been approved; and
transmitting, to the external system, the message indicating that the operation has been approved.

14. The one or more non-transitory, computer-readable media of claim 13,
wherein the operations is received via a first communication network, and
wherein the second suboperation is transmitted via a second communication network that is different from the first communication network.

15. The one or more non-transitory, computer-readable media of claim 13,
wherein the operations is received via a first communication network, and
wherein the indication that the second suboperation was successfully executed is received via a second communication network that is different from the first communication network.

16. The one or more non-transitory, computer-readable media of claim 13,
wherein the aggregated virtual container is associated with a plurality of tokens, and wherein the second suboperation is associated with a token selected from the plurality of tokens.

17. The one or more non-transitory, computer-readable media of claim 16, wherein the user system is associated with the token selected from the plurality of tokens.

18. The one or more non-transitory, computer-readable media of claim 13, wherein the operations further comprise:
generating, based on an access restriction not being in place for the user and prior to transmitting the second suboperation, a different message indicating that the operation has been provisionally executed; and
transmitting the different message to the external system.

19. The one or more non-transitory, computer-readable media of claim 13, wherein the operations further comprise:
generating, based on an access restriction being in place for the user, a hold request for the operation.

20. The one or more non-transitory, computer-readable media of claim 13, wherein the operations further comprise:
generating, based on the indication that the second suboperation was successfully executed, a release request that allows transmission of the message indicating that the operation has been approved.

* * * * *